United States Patent
Clark et al.

(10) Patent No.: US 7,865,915 B1
(45) Date of Patent: Jan. 4, 2011

(54) CONTENT DISCOVERY AND DIFFERENTIAL ADVERTISING IN VIDEO DISTRIBUTION NETWORKS

(75) Inventors: James Allen Clark, Cumming, GA (US); John Robert Horrobin, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 2413 days.

(21) Appl. No.: 09/864,360

(22) Filed: May 23, 2001

(51) Int. Cl.
*H04N 7/16* (2006.01)

(52) U.S. Cl. .................. 725/10; 725/109; 725/110; 725/111; 709/219; 709/231

(58) Field of Classification Search ............... 725/9–31, 725/46, 86–120; 709/217–231
See application file for complete search history.

(56) References Cited

U.S. PATENT DOCUMENTS

| | | | | | |
|---|---|---|---|---|---|
| 5,758,257 | A | * | 5/1998 | Herz et al. | 725/116 |
| 5,796,952 | A | * | 8/1998 | Davis et al. | 709/224 |
| 5,977,964 | A | * | 11/1999 | Williams et al. | 715/721 |
| 5,995,092 | A | * | 11/1999 | Yuen et al. | 725/40 |
| 5,999,521 | A | * | 12/1999 | Thompson | 370/328 |
| 6,047,194 | A | * | 4/2000 | Andersson | 455/466 |
| 6,088,722 | A | * | 7/2000 | Herz et al. | 709/217 |
| 6,088,826 | A | * | 7/2000 | Teich | 714/774 |
| 6,101,528 | A | * | 8/2000 | Butt | 709/203 |
| 6,181,704 | B1 | * | 1/2001 | Drottar et al. | 370/410 |
| 6,195,090 | B1 | * | 2/2001 | Riggins, III | 725/139 |
| 6,286,140 | B1 | * | 9/2001 | Ivanyi | 725/14 |
| 6,298,482 | B1 | * | 10/2001 | Seidman et al. | 725/101 |
| 6,363,422 | B1 | * | 3/2002 | Hunter et al. | 709/224 |
| 6,530,082 | B1 | * | 3/2003 | Del Sesto et al. | 725/9 |
| 6,637,029 | B1 | * | 10/2003 | Maissel et al. | 725/46 |
| 6,779,004 | B1 | * | 8/2004 | Zintel | 709/227 |
| 7,003,790 | B1 | * | 2/2006 | Inoue et al. | 725/10 |
| 7,016,956 | B2 | * | 3/2006 | Dobbins et al. | 709/224 |

* cited by examiner

*Primary Examiner*—Annan Q Shang
(74) *Attorney, Agent, or Firm*—Marger Johnson & McCollom, P.C.

(57) ABSTRACT

A method and apparatus for monitoring use patterns or services available information in video distribution networks. A network termination unit receives the video content through a port, demodulates and decodes the signals to produce display signals. The display signals are displayed on a viewing device connected to the network termination unit and the network termination unit monitors the use patterns and/or services available information of the viewing device. The unit then formats the use patterns or services available information into use pattern network packets and transmits them. A content analyzer receives use pattern packet from a network termination unit and decode them to access the data. The content analyzer then analyzes the use patterns and/or services available information and characterizes the unit. The characterization of the unit is then used to target content to that unit.

37 Claims, 2 Drawing Sheets

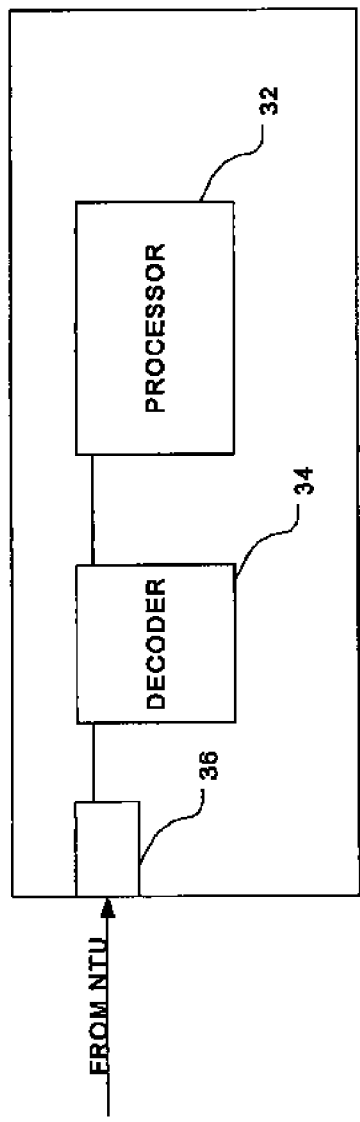
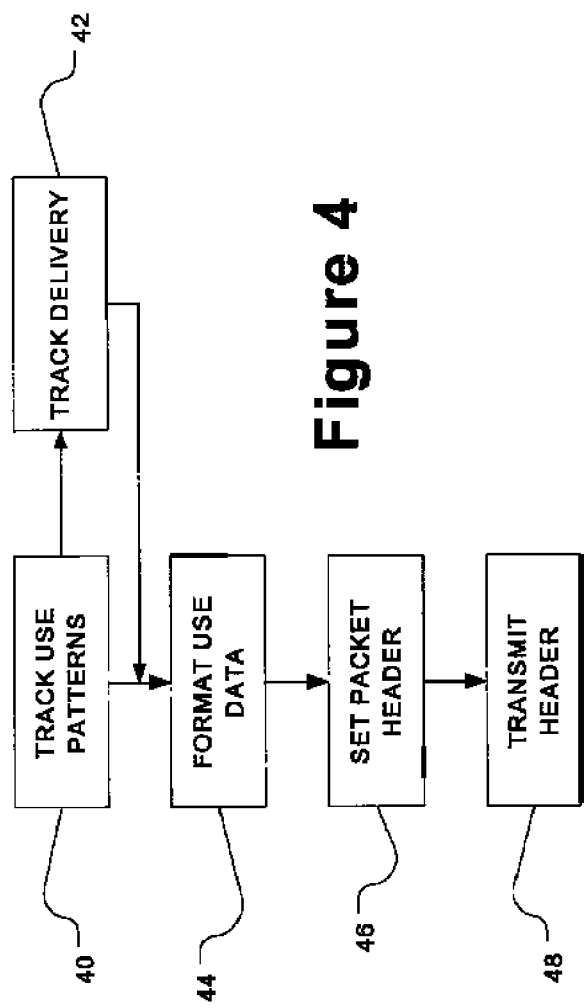

CONTENT DISCOVERY AND DIFFERENTIAL ADVERTISING IN VIDEO DISTRIBUTION NETWORKS

BACKGROUND

1. Field

This disclosure relates to methods for collecting and reporting content in video streams, more particularly to methods for collecting and reporting content in video streams.

2. Background

The transmission of video content via cable is a fairly complex process. In the digital cable market, for example, the content is distributed from regional centers. Each region center is often referred to as a head-end. The head-end assembles multiple sources of video content, typically in MPEG (Moving Picture Experts Group) format for digital video. This multiple sources are then groomed into a preferred set of programs.

The preferred set of programs is then replicated as needed and transmitted to local hubs for the digital cable network. Currently, this transmission is done using DVB-ASI framing around digital video MPEG-2 transport packets, but may also be done via an Internet Protocol (IP) network. In order to transmit this data across these networks, the MPEG programs are broken up into standardized packets, with each packet being an IP packet. While not currently being used, the packets could also be frames for a Frame Relay network or packets for an Asynchronous Transfer Mode (ATM) network.

The MPEG programs encapsulated into IP packets are then multicast or unicast to the various local hubs, referred to as distribution hubs (D-hubs). When the IP packets arrive at the D-hub, the MPEG programs are reconstructed using the known characteristics of the IP packets, such as the time stamps, etc., that allow the programs to be reconstructed correctly. The programming sets are then sent to equipment that converts the MPEG signals into modulated RF (radio frequency) signals. The RF signals are received by network termination units, such as cable set top boxes and cable modems. The programs are then demodulated as desired for display by the viewing device, such as a television or cable modem.

Currently, most auxiliary information that accompanies the programs, including advertising, can only be targeted at a very high level. For example, most of the head-ends and D-hubs can be sent particular geographic information. Alternative or in addition to the geographic targeting, predictive analysis techniques can be used. An example of this is the data provided by Nielsen Research. It would seem useful to have some way to more closely tailor the information sent along with the programs.

SUMMARY

One aspect of the disclosure is a network termination unit. The unit includes a port to receive video content signals, which may include programs and/or advertising. The unit also includes a demodulator operable to demodulate the video content signals and a decoder operable to decode the demodulated signals into display signals. The network termination unit is typically attached to a viewing device operable to display the display signals. A module in the unit may monitor the use patterns or services available information of a user viewing the display signals and form use pattern network packets, or simply monitor all services 'seen' at that point of the network that are transmitted back through the video distribution network.

Another aspect of the disclosure is a content analyzer resident on the video distribution network that receives the use pattern packets and decodes them. The content analyzer then analyzes the decoded data and characterizes the network termination unit sending the packets. This characterization is then use by the system to target video content to that unit.

BRIEF DESCRIPTION OF THE DRAWINGS

The invention may be best understood by reading the disclosure with reference to the drawings, wherein:

FIG. 3 shows one embodiment of a content analyzer, in accordance with the invention.

FIG. 4 shows one embodiment of a method to transmit content information, in accordance with the invention.

DETAILED DESCRIPTION OF THE EMBODIMENTS

Figure 1:
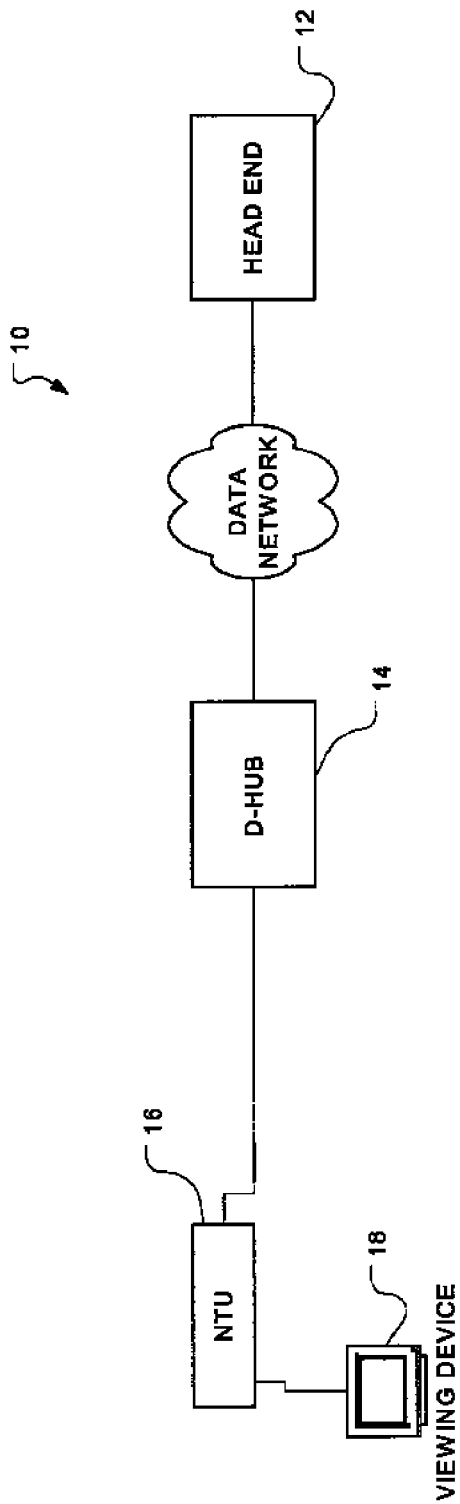
FIG. 1 shows one embodiment of a video content distribution network, in accordance with the invention.

An embodiment of a video distribution network 10 in accordance with the invention is shown in FIG. 1. A regional distribution center 12, referred to as the head end, receives a set of programs in MPEG format. The head-end 12 then breaks up these programs into network packets, for example IP packets. The term packet as used here includes frame relay network frames, as well as packets for asynchronous transfer mode networks.

The resulting packets are then place on the network between the head end and the distribution hub 14. The distribution hub then reconstructs the programs from the packets, using the characteristics of the packets defined by the network standard. For example, packets across an IP network typically have a timestamp in the header that allows the packets to be reordered into their proper order. The distribution hub then reassembles the program data from the packets, removing the encapsulation and reconstructing the programs.

Once reconstructed, the distribution hub 14 then converts the programs into radio frequency (RF) signals for transmission across a coaxial cable network to the cable subscribers. The RF signals are typically decoded and converted to display signals by a network termination unit, or NTU 16. The NTU 16 decodes and converts the signals into the display format necessary for the associated viewing device 18. If the viewing device 18 is a television, for example, the NTU would be a set-top box. If the viewing device 18 is a personal computer or other computing device, the NTU would be a cable modem. Note that the term computing device, as used here, is any device that receives signals from a cable modem and converts them into viewable format.

Figure 2:
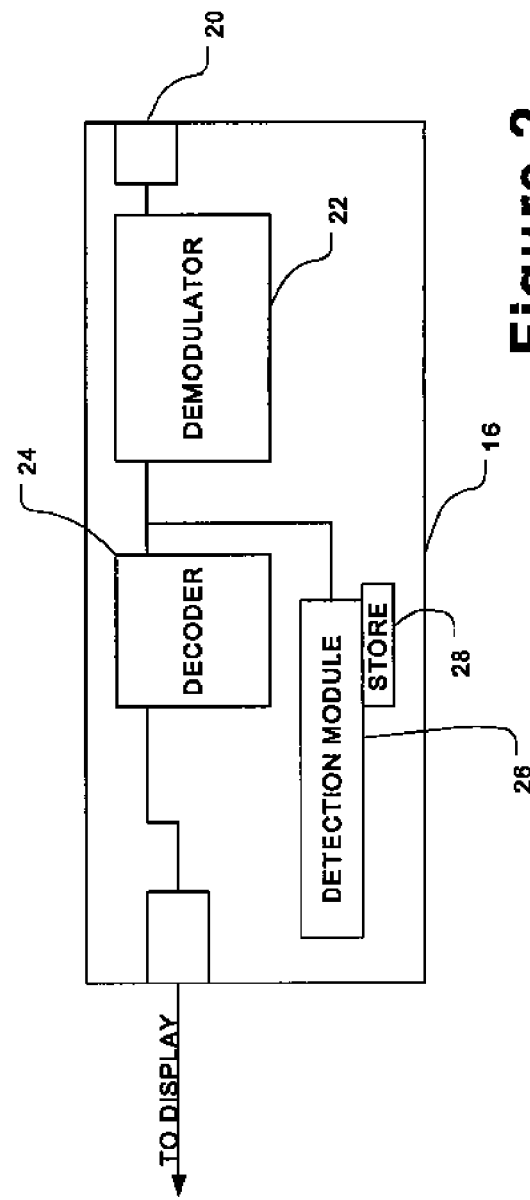
FIG. 2 shows one embodiment of a network termination unit, in accordance with the invention.

An embodiment of the NTU is shown in FIG. 2. As mentioned previously, the NTU could be a cable set-top box for television or a cable modem, as examples. The NTU 16 has a port 20 operable to receive incoming content. The content may include video content such as the programs, mentioned previously as well as associated information, such as advertising, as well as other types of content as discussed below. The content will more than likely be in the form of modulated RF signals from the distribution hub 14 of FIG. 1. Therefore, a demodulator would be needed to demodulate the RF signals into the original MPEG or other transport stream. The demodulator is operable to demodulate the signals of the channel selected by the user. A decoder 24 then decodes the MPEG transport stream and converts it into display signals appropriate for the viewing device of the user. These display signals are then transmitted to the display.

Detection module 26 detects the signals resulting from the demodulation. In one embodiment the module 26 detects the signals prior to being decoded from the MPEG format. This allows the module to decode the transport stream identifier (TSID) of a given MPEG program. The TSIDs of programs selected over a period of time would then be stored as use pattern or services available information in the detection module. However, it is possible that the detection could be done at other points in the process of converting the incoming signals to the display signals and this is intended only as an example. Using the TSIDs, however, has the advantage of using a mechanism that is already present in the system, without having to add anything.

The resulting TSIDs or other data used to track use patterns or services available information or services available information may be stored in the storage 28. The detection module 26 would then periodically send usage information back to the distribution hub or head end to allow analysis of the use patterns. Typically, the analysis will not be performed by the set-top box or cable modem. Generally, the desire is to keep these devices inexpensive and small, and the addition of extra circuitry and memory to them would be counter to these goals.

In order for the use patterns or services available information or services available information to be transmitted back to the distribution hub or the head end, the patterns or information would have to be encapsulated in such a manner that the receiver would be able to recognize them as use pattern packets. Generally, the network packets mentioned above conform to a standard format, with a header and a payload. The header normally contains information about the payload data, including the time stamp or some other means to identify the ordering of the data in a larger set of data. In addition, there are flags or other indicators that announce the type of payload data in that packet.

In one embodiment of the invention, the header includes at least one flag bit that would identify the payload as use pattern or services available data. Both of these types of information will be formatted into packets referred to as use pattern packets. The format of the header that identifies use pattern packets, as well as the format of the payload data, will be referred to as content discovery protocol. The content discovery protocol will allow the video distribution network to identify those packets as use pattern packets and route them to the appropriate point in the network.

The use pattern packets should be routed to a content analyzer at some point in the network. The point may be at the distribution hub or at the head end, or even further up the chain from the NTU. The content analyzer may also be a part of an existing piece of equipment and would merely involve reprogramming that equipment to perform additional functions, which will be discussed in more detail later.

One embodiment of a content analyzer is shown in FIG. 3. The content analyzer has a port 36 operable to receive use pattern packets from the various NTUs. The decoder 34 would decode the use pattern packets, in accordance with the content discovery protocol. The content discovery protocol identifies the order and information contained in the payload data, as well as the header. This allows the decoder to 'unpack' the payload data and reconstruct the use patterns or services available information or services available information stored and sent by the NTUs. Within that data will also be some sort of identifier to identify the NTU. For example, in current cable systems, set-top boxes each have their own specific Ids, allowing the cable companies to track costs and provide service. In some systems, the NTU may be similar to a network address, such as an IP address.

Once the data is decoded, the content analyzer will analyze the data. This will typically be done using a processor, although the definition of processor as used here includes microcontrollers, application specific integrated circuits (ASICs), field programmable gate arrays (FPGAs), and the like. The analysis of the data will allow the analyzer to characterize the NTU from which the data was received. The content analyzer or other devices in the distribution network may use the characterization to target content to that NTU, and through that NTU to the user. The content may include programs, advertising, or other types of information that can be inserted into the content signals.

In addition to tracking the use patterns or services available information of a particular user or viewing device, the NTU could also serve as a quality control for the video distribution network. For example, using the TSID example mention previously, the NTU could determine which programs were reaching the NTU, as well as if all of the packets are arriving properly. This would have a further benefit of allowing advertisers to track if the targeted advertising reached its intended audience, allowing more accurate monitoring of the impact. Knowing that the advertisement has reached its target allows the advertiser to confirm delivery rather than having to estimate how many of the users saw the advertisers. The tracking of this delivery would be formatted into the same packets used to transmit the use patterns.

Alternatively, or in addition to, the MPEG transport or other transport protocol for video delivery, the content may include out-of-band signaling. Out-of-band (OOB) signaling is typically used for command and control aspects of the network termination unit. This OOB signaling may be used for enhanced video content, or other services associated with the content delivery. The NTU discovery process may also be used to track and report on usage patterns of these service extensions. This usage will be reported using the same discovery protocol discussed above.

FIG. 4 shows one embodiment of a method of forming and transmitting these packets at the NTU. The use patterns or services available information are tracked at 40. As an optional step the delivery is tracked at 42 as mentioned above. The 'use' data referred to here may include the use patterns or services available information and the delivery confirmation data of the video content. This data is then formatted at 44, into the use pattern packets discussed previously. Again, for ease of decoding this format should conform to the content discovery protocol discussed above.

In order to identify the payload data encapsulated in the network packets, the header must be set in accordance with whatever data network is being used for the video distribution network. In most current examples of these networks, the protocol in Internet Protocol. The header is set with the appropriate flag, yet to be determined, that will identify the payload data as content discovery data. Finally, at 48, the NTU will transmit the packets back to the video distribution network for analysis.

As mentioned previously, the content analyzer that receives these packets may be any part of the network that is already currently in existence. A software upgrade to the processor in this piece of equipment would provide the additional instructions necessary to implement the analysis of the use data. Similarly, the set-top boxes and cable modems already in existence may already have the necessary hardware in place. All that is needed is an upgrade to the operating software in those NTUs to allow them to perform the methods of the invention.

The invention may be implemented by installing machine-readable code in these NTUs from an article containing the code. The code, when executed, causes the machine to implement the methods of the invention. The machine is some sort of computing device, as defined above, but typically will be a cable modem or set-top box.

Thus, although there has been described to this point a particular embodiment for a method and apparatus for content discovery in video distribution networks, it is not intended that such specific references be considered as limitations upon the scope of this invention except in-so-far as set forth in the following claims.

What is claimed is:

1. A network termination unit, comprising:
   a port operable to receive content signals;
   a demodulator operable to demodulate the content signals into demodulated content signals;
   a decoder operable to decode the demodulated content signals into display signals; and
   a module operable to:
      extract content identifying data associated with a particular content signal of the content signals from that particular content signal,
      detect use patterns of a user viewing display signals on a viewing device,
      transmit the use patterns as use pattern packets,
      detect services available information, the services available information indicating an availability of services at the network termination unit, and
      transmit the services available information in the use pattern packets.

2. The network termination unit of claim 1, wherein the network termination unit further comprises a set-top box.

3. The network termination unit of claim 1, wherein the network termination unit further comprises a cable modem.

4. The network termination unit of claim 1, wherein the viewing device further comprises a television.

5. The network termination unit of claim 1, wherein the viewing device further comprises a computing device.

6. The network termination unit of claim 1, wherein the use pattern packets are identified as such using a content discovery protocol that uniquely identifies use pattern packets from among other packets.

7. The network termination unit of claim 1, wherein the decoder is also operable to decode the demodulated content signals into command and control signals.

8. A content analyzer, comprising:
   a port operable to receive use pattern packets from a network termination unit;
   a decoder operable to decode the use pattern packets into data;
   a processor operable to:
      analyze the data to derive viewing information;
      monitor services available information, the services available information indicating an availability of services at the network termination unit; and
      characterize the network termination unit by that viewing information.

9. The content analyzer of claim 8, wherein the content analyzer resides at the distribution hub.

10. The content analyzer of claim 8, wherein the content analyzer resides at the head end.

11. The content analyzer of claim 8, wherein the decoder decodes the use pattern packets in accordance with a content discovery protocol that uniquely identifies use pattern packets from among other packets.

12. The content analyzer of claim 8, wherein the processor is operable to use the characterization of the network termination unit to target video content to that network termination unit.

13. A method of transmitting use patterns, the method comprising:
   tracking use patterns of a viewing device, based upon selection of content on the viewing device;
   tracking services available information, the services available information indicating an availability of services for the viewing device;
   formatting data representative of the use patterns or services available information into network packets as payload data;
   setting a network packet header to identify the payload as use patterns, forming a use pattern packet; and
   transmitting the use pattern packet.

14. The method of claim 13, wherein setting a network packet header is done in accordance with a content discovery protocol that uniquely identifies use pattern packets from among other packets.

15. The method of claim 13, wherein the method further comprises tracking video content delivery to the viewing device.

16. The method of claim 15, wherein the video content further comprises programs.

17. The method of claim 15, wherein the video content further comprises advertising.

18. The method of claim 13, wherein the use patterns or services available information of a viewing device further comprises use patterns or services available information of service extension offered on the viewing device.

19. A network termination unit, comprising:
   a means for receiving video content signals;
   a means for demodulating the video content signals into demodulated video content signals;
   a means for decoding the demodulated video content signals into display signals;
   a means for displaying the display signals;
   a means for extracting content identifying data associated with a particular video content signal of the video content signals from that particular video content signal, and
   a means for detecting use patterns of a user viewing display signals on the viewing device;
   a means for detecting services available information, the services available information indicating an availability of services at the network termination unit; and
   a means for transmitting the use patterns and services available information as use pattern packets.

20. The network termination unit of claim 19, wherein the network termination unit further comprises a cable set-top box.

21. The network termination unit of claim 19, wherein the network termination unit further comprises a cable modem.

22. The network termination unit of claim 19, wherein the means for detecting services available information is operable to detect delivery of video content.

23. A content analyzer, comprising:
   a means for receiving use pattern packets from a network termination unit;
   a means for decoding the use pattern packets into data; and
   a processing means operable to:
      analyze the data to derive viewing information;
      monitor the data for services available information, the services available information indicating an availability of services at the network termination unit; and characterize the network termination unit by the viewing information and the services available information.

24. The content analyzer of claim 23, wherein the content analyzer resides at a distribution hub.

25. The content analyzer of claim 23, wherein the content analyzer resides at a head end.

26. The content analyzer of claim 23, wherein the processor is further operable to target the network termination unit by its characterization.

27. An article containing machine-readable code that, when executed, causes the machine to:
   track use patterns or services available information of a viewing device, based upon selection of video content on the viewing device;
   track services available information, the services available information indicating an availability of services for the viewing device;
   format data representative of the use patterns or services available information into network packets as payload data;
   set a network packet header to identify the payload as use patterns, forming a use pattern packet; and
   transmit the use pattern packet.

28. The article of claim 27, wherein the article contains machine-readable code that, when executed, further causes the machine to monitor status of delivery of video content.

29. The content analyzer of claim 8, wherein the processor is further operable to track a quality of service of services provided to the network termination unit.

30. The content analyzer of claim 29, wherein the processor is further operable to track reception of content signals by the network termination unit.

31. The content analyzer of claim 29, wherein the processor is further operable to determine if data of a particular service that should have been received by the network termination unit at a point in time was received by the network termination unit.

32. The content analyzer of claim 29, wherein the processor is further operable to verify a complete delivery of an advertisement to the network termination unit.

33. The network termination unit of claim 1, further comprising a module operable to monitor a quality of service of the content signals.

34. The network termination unit of claim 33, wherein the module operable to monitor the quality of service is further operable to track reception of the content signals by the network termination unit.

35. The network termination unit of claim 33, wherein the module operable to monitor the quality of service is further operable to determine if data of a monitored content signal that should have been received at a point in time was received.

36. The network termination unit of claim 33, wherein the module operable to monitor the quality of service is further operable to verify a complete delivery of an advertisement.

37. The network termination unit of claim 1, wherein the content identifying data is a transport stream identifier.

* * * * *